United States Patent [19]
Jenkins et al.

[11] Patent Number: 4,805,342
[45] Date of Patent: Feb. 21, 1989

[54] PLANT IRRIGATION SYSTEM

[76] Inventors: Wayne C. Jenkins, 2764 SW. 10th St., Boynton Beach, Fla. 33435; Richard P. Marx, 1068 Larch Way, W. Palm Beach, Fla. 33414

[21] Appl. No.: 870,849

[22] Filed: Jun. 5, 1986

[51] Int. Cl.⁴ .......................... A01G 27/00
[52] U.S. Cl. ............................ 47/79
[58] Field of Search ............ 47/79, 48.5, 47; 182/150, 53, 55; 248/312, 242, 214, 213.2; 247/DIG. 9

[56] References Cited

U.S. PATENT DOCUMENTS

| | | | |
|---|---|---|---|
| 1,231,976 | 7/1917 | Weitzel | 47/79 |
| 2,241,699 | 5/1941 | Cooper | 47/62 |
| 2,870,574 | 1/1959 | Sheridan | 47/1.2 |
| 3,168,797 | 2/1965 | Patassy | 47/38 |
| 3,384,987 | 5/1968 | Prechtl | 248/DIG. 9 |
| 3,664,626 | 5/1972 | Sneller | 248/214 |
| 4,057,933 | 11/1977 | Enyeart | 47/79 |
| 4,070,794 | 1/1978 | Gibbs | 47/79 |
| 4,115,951 | 9/1978 | Becker et al. | 47/48.5 |
| 4,149,340 | 4/1979 | DaVitoria-Lobo | 47/79 |
| 4,183,176 | 1/1980 | Barfield | 47/79 |
| 4,198,784 | 4/1980 | Sukert | 47/79 |
| 4,265,050 | 5/1981 | Buescher | 47/79 |
| 4,281,625 | 8/1981 | Kasai | 119/77 |
| 4,300,309 | 11/1981 | Mincy | 47/48.5 |
| 4,332,105 | 6/1982 | Nir | 47/79 |
| 4,447,983 | 5/1984 | Shinada | 47/48 |
| 4,475,626 | 10/1984 | Gleich | 182/150 |
| 4,527,353 | 7/1985 | Newby | 47/59 |
| 4,542,762 | 9/1985 | Littlehale | 137/78 |

FOREIGN PATENT DOCUMENTS 8101940  7/1981  World Int. Prop. O. ............. 47/62

Primary Examiner—Mickey Yu
Attorney, Agent, or Firm—Steele, Gould & Fried

[57] ABSTRACT

Plant irrigation apparatus is provided with a reservoir. Water is placed inside the reservoir filling a portion of its volume. A pressurized gas is also introduced into the reservoir. The water is forced by the gas pressure out of the reservoir through at least one outlet conduit communicating with the water in the reservoir. Water leaves the outlet conduits through at least one discharge outlet. The apparatus can include structure for hanging the apparatus from a plant grow pot. Pressure indicating structure can also be provided.

9 Claims, 2 Drawing Sheets

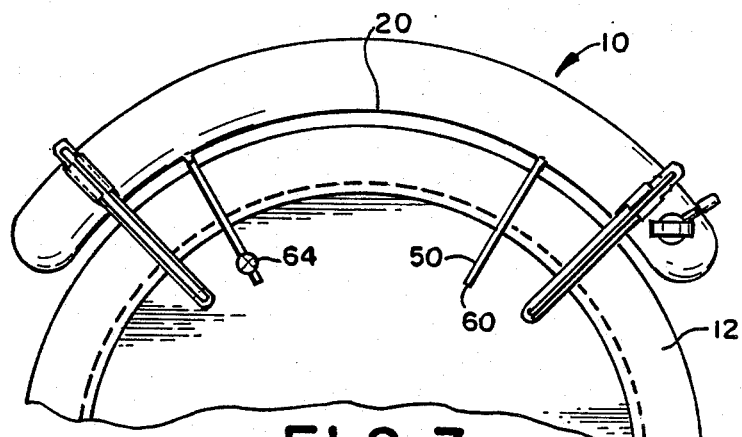
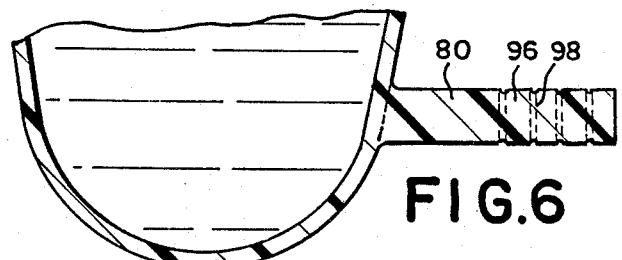
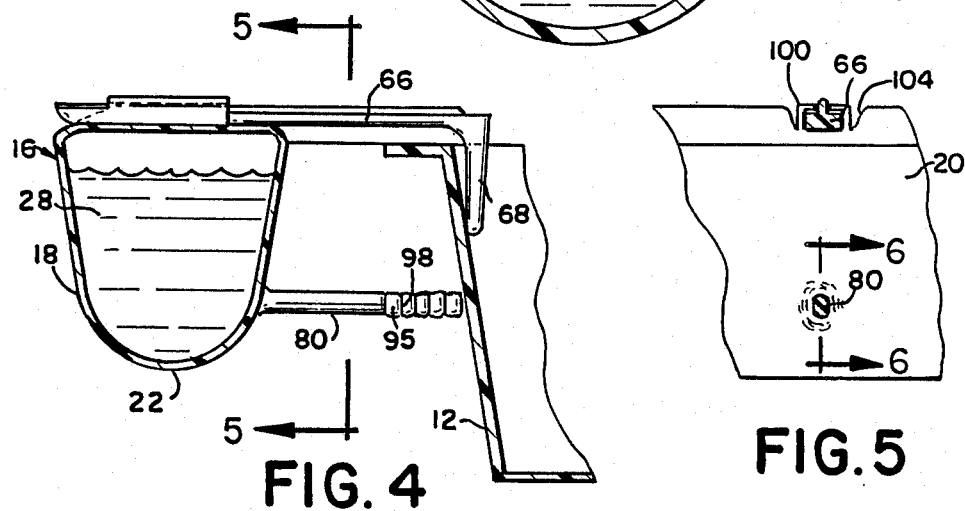

PLANT IRRIGATION SYSTEM

BACKGROUND OF THE INVENTION

1. Field of the Invention

This invention relates generally to plant watering apparatus, and particularly to self contained, refillable plant watering apparatus.

2. Description of the Prior Art

Regular plant watering is necessary for proper care of the plant. The usual practice is to water the plant at regular intervals. This method produces large variations in the amount of water in the soil. A good deal of manual labor is required to repeatedly water large numbers of plants, as in commercial settings.

A number of inventions have been directed to automatic plant watering systems. These systems are usually bulky and unsightly, and therefore are particularly undesirable in commercial decorative settings. A number of gravity fed automatic plant waterers are available. It is necessary however to place the water reservoir above the level of the soil. The reservoir is then usually partially or fully in view. It would be a desirable to provide a plant watering system which would remain out of the view of observers of the plant. It would also be desirable to provide a plant watering system which would supply water to the plant at an essentially constant rate. The moisture content of the soil could then be continuously maintained at or near the optimal level for the particular plant. It would be desirable to provide a plant watering apparatus which is not expensive to own and operate, and thus ideal for the commercial setting. It would also be desirable to provide a plant watering apparatus which could be operated by relatively inexperienced workers.

Some plant watering devices provide a water reservoir below the grow pot and in contact with the soil. The water travels upward by a capillary attraction through the soil to the plant. All soils do not have the same ability to transfer water in this manner, and an insufficient supply of water may result. It would be desirable to provide a plant watering apparatus which will therefore supply water to the plant regardless of the type of soil in the grow pot.

SUMMARY OF THE INVENTION

It is an object of the invention to provide a plant watering apparatus which will operate continuously yet remain out of view.

It is another object of the invention to provide a plant watering apparatus which can continuously deliver a liquid stream to an altitude above that of the liquid reservoir.

It is yet another object of the invention to provide a plant watering apparatus which is capable of maintaining the moisture level in the soil at a substantially constant level.

It is another object of the invention to provide a plant watering apparatus which can be operated by relatively inexperienced workers.

It is still another object of the invention to provide a plant watering apparatus which is relatively inexpensive to manufacture.

It is another object to the invention to provide a plant watering apparatus which is relatively inexpensive to operate.

It is yet another object of the invention to provide a plant watering apparatus which is capable of supplying nutrients to the plant soil.

It is another object of the invention to provide a plant watering apparatus which can be hung from the side of the plant grow pot.

These and other objects are accomplished by plant watering apparatus in which a reservoir is provided to hold a supply of water. The structure through which the water enters the reservoir is preferably hermetically sealed. A pressurized gas is introduced into the reservoir through suitable structure. The gas pressure forces the water out of the reservoir through at least one outlet conduit. The outlet conduits have associated therewith at least one discharge outlet, which may be of capillary dimensions and through which the water may escape to the plant soil.

The outlet conduits are preferably in the form of tubes which communicate with the interior of the reservoir at or near its bottom. The tubes extend over the rim of the grow pot such that the discharge outlet is positioned over or in the soil in the grow pot. Gas pressure in the reservoir permits the delivery of water to a point above the surface of the water in the reservoir. The reservoir may then be positioned alongside the plant grow pot, between the side wall of the grow pot and a decorative container. In this manner the reservoir is substantially out of view.

The reservoir is periodically replenished with liquid and gas. The reservoir may include structure for indicating when the proper amount of water is in the reservoir. Additional structure may be provided for indicating when a proper gas pressure has been introduced into the reservoir.

Structure may be provided for conveniently hanging the reservoir from the side of a grow pot. This structure may include a hanger affixed to the reservoir which engages the side of the grow pot. The hanger may have a hook portion at its distal end which slips over the side of the grow pot. It is desirable to provide an adjustable hanger, and therefore structure is provided for slideably mounting the hanger to the reservoir. A leveling arm may be provided to counteract the tendency of the reservoir to pivot about the side of the grow pot. The leveling arm is adapted for use with different sizes and styles of grow pots, and preferably is adjustable in length.

BRIEF DESCRIPTION OF THE DRAWINGS

There are shown in the drawings and embodiments which are presently preferred it being understood, however, that the invention is not limited to the precise arrangements and instrumentalities shown, wherein:

FIG. 3 is a plan view of the plant watering apparatus of FIG. 1.

FIG. 4 is a cross section taken along line 4—4 in FIG. 3.

FIG. 5 is a cross section taken along line 5—5 in FIG. 4.

FIG. 6 is a cross section taken along line 6—6 in FIG. 5.

DETAILED DESCRIPTION OF THE PREFERRED EMBODIMENTS

Figure 1:
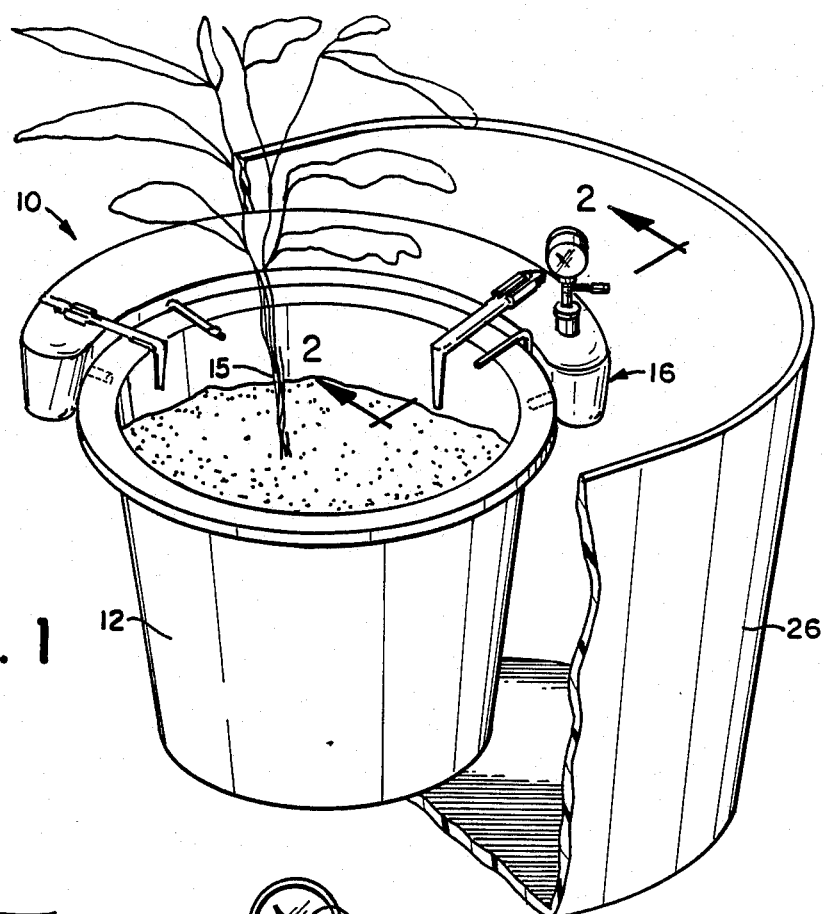
FIG. 1 is a perspective view of a plant watering apparatus according to the invention.

Referring to FIGS. 1-6, there is shown a plant watering apparatus 10 according to the invention hanging from a plant grow pot 12 containng soil 14 and plant 15. The plant watering appartus includes a reservoir 16. The reservoir 16 is a closed pressure vessel with an exterior wall portion 18, an interior wall portion 20, the bottom portion 22, and the top portion 24. The reservoir 16 is preferably contoured to match the exterior of the grow pot 12 as shown. Interior surface 20 of the reservoir 16 accordingly has a radius of curvature substantially similar to that of the grow pot 12 (FIG. 3). The reservoir 16 thereby hugs the grow pot 12 and can be fashionably concealed between the grow pot 12 and a decorative container 26.

The pressure vessel is filled with water 28 which must be conveyed to the soil 14. Water may be supplied to the reservoir 16 through a suitable opening 30 in the top portion 24 of the reservoir 16. A tubular neck portion 32 formed about the opening 30 may bear cap attachment means such as threads 34 which detachably secures cap means such as water fill cap 40 to close off contact of the interior of the pressure vessel 14 with the surrounding atmosphere through the opening 30. The cap 40 should provide a hermetic seal between the interior of the reservoir 16 and the surrounding atmosphere. This can be accomplished by providing suitable sealing means such as gaskets, as would be apparent to one skilled in the art.

The apparatus 10 is provided with means for inletting a pressurized gas over liquid 28 in the closed reservoir 16. Suitable means such as valve 44 are provided for this purpose. The valve 44 in one position permits gas flow therethrough and thus entrance of pressurized gas into the reservoir 16. In another position the valve hermatically seals the reserovir 16 to contain the pressurized gas. The valve 44 may be of the biased plunger type commonly used in bicycle and automobile tires. The gas filling valve 44 may be conveniently provided in combination with the water fill cap 40 as shown. The gas filling valve may of course be provided elsewhere, as would be apparent to one skilled in the art. Pressurized gas is provided from a suitable pressurized gas source, which may include a compressor or pressurized gas bottle. Preferable gas pressures have been found to be 5-40 PSIG, and the gas source accordingly should be capable of delivering these pressures.

At least one water outlet conduit 50 is provided to convey the water 28 to the plant soil 14. The outlet conduit 50 preferably communicates with the interior of the reservoir 16 at or near its bottom portion 22 to permit most of the initial water volume to pass from the reservoir 16. The outlet conduit 50 provides a passageway for the water 28, under the pressure of the gas trapped near the top portion 24 of the reservoir, to travel to the soil 14. The outlet conduit 50 may be conveniently provided as a flexible tube such that it can be positioned wherever desired. It is also possible to provide outlet conduits as substantially rigid, permanently positioned members where the plant watering apparatus is designed for a particular grow pot size and/or shape.

The outlet conduits 50 carry water from the reservoir 16 to a position at or near the soil 14. Each outlet conduit 50 has at least one discharge outlet 60 where release of water is desired. The discharge outlet 60 is preferably of capillary dimensions such that the pressurized water will slowly trickle out of the capillary opening. The discharge outlet 60 may be a hole formed through the wall of the outlet conduit 50, or may be in the form of a small discharge nozzle or the like. It is also possible to provide valve means 64 to adjustably regulate the flow of fluid through the discharge openings 60.

The pressure of the gas and the size of the discharge outlet 60 may be adjusted to obtain a particular desired flow rate of water to the soil. The parameters of the apparatus including discharge outlet dimensions, gas pressure, temperatues and compositions of the gas and liquid; and the like for a desired flow rate will commonly be interdependent and difficult to predict with accuracy. It is therefore usually necessary to obtain these parameters empirically.

A feature of the invention is its ability to continuously discharge a liquid stream to the plant soil for a period of time at a level above that of the liquid in the reservoir 16. This is a significant advantage over traditional gravity fed watering devices, because the reservoir may be placed below or alongside the grow pot where it is not readily visible. A preferable positioning would suspend the reservoir alongside the grow pot 12 and between the grow pot 12 and decorative container 26. The apparatus 10 would then be almost completely out of the view of the plant observer.

Figure 2:
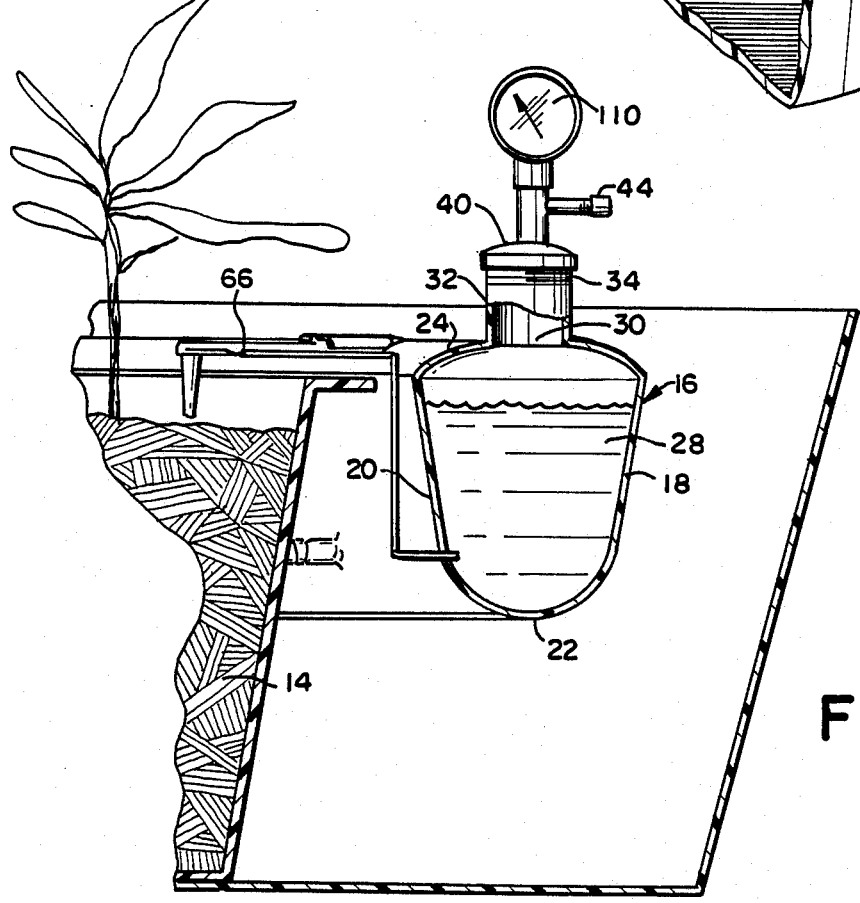
FIG. 2 is a cross section taken along line 2—2 in FIG. 1.

The reservoir 16 may be suspended from the grow pot by suitable hanging means such as hanger 66. The hanger 66 may be affixed directly to the reservoir 16, and can include a downwardly directed hook portion 68 which engages the interior wall of the grow pot 12 as shown in FIG. 2. It is preferable to provide leveling means such as leveling arm 80 which preferably extends from the interior surface 20 or the bottom portion 22 of the reservoir 16 to abut the exterior sidewall of the grow pot 12. The leveling arm 80 preferably is segmented into break-away tab portions 96 by suitable means such as striations 98. The tab portions 96 are manually snapped off to properly position the leveling arm 80 against the exterior wall of the particular grow pot 12. The leveling arm 80 prevents pivoting of the reservoir 16 and helps to keep the hanger 66 securely engaged to the grow pot 12.

The plant watering apparatus 10 according to the invention may be formed to fit one particular size and shape of grow pot. It is also possible to adapt the apparatus for many sizes and shapes of grow pots. One embodiment of such an apparatus would include a bracket 100 affixed to the reservoir 16, as at the top portion 24, and which slidably engages the hanger 66 such that the reservoir 16 may be moved inward or outward with reference to the distal end or hook portion 68 of the hanger 66. Groove means 104 may be formed in the top portion 24 of the reservoir 16 to permit inward and outward movement of the hanger 66.

The gases suitable for use with the invention may include commonly found gases such as air, nitrogen and carbon dioxide. Nitrogen and carbon dioxide are especially desirable since they may dissolve into the liquid and provide the plant with additional nutrients. The apparatus is especially useful for supplying plants with water. It is within the scope of the invention, however, to mix plant maintenance chemicals such as insecticides and nutrients with the water to simultaneously water and treat the plant. It is also within the scope of the invention to use the apparatus of the invention with an alternative liquid other than water, such as liquid fertilizer and insecticides.

Operation of the plant watering apparatus begins with charging the reservoir 16 with liquid and gas. The valve 44 is opened to relieve any residual gas pressure. The water fill cap 40 may then be removed. Liquid is poured into the reservoir 16 from a suitable source. A suitable liquid level indicator may be provided to signal when the proper amount of liquid is in the reservoir 16. The water fill cap 40 is replaced and secured such that a hermetic seal is formed. A pressurized gas source is attached to the valve 44 until the proper gas pressure level is reached. Gas pressure may be read from a suitable pressure indicating means such as pressure gauge 110 or the like, which may conveniently be provided on the water fill cap 40. The pressure gauge 110 may alternatively be replaced by a pop-up pressure indicator, which rises when the proper gas pressure has been reached, or by other suitable means. The valve 44 is then closed, or allowed to close if it is of the type that is biased toward the closed position. The gas source is removed, and the reservoir is positioned next to the plant grow pot 12. The hanger 66 extends over the top end of the grow pot 12, wherein the hook portion 68 engages the interior wall of the plant grow pot 12. The reservoir 16 may be closely positioned adjacent the grow pot 12 by sliding the reservoir 16 and bracket 100 inward relative to the hanger 66. If the leveling arm 80 has not already been sized for the particular grow pot 12, tab portions 96 may be broken along striations 98 to provide a leveling arm of the proper length for the particular grow pot.

The outlet conduits 50 if flexible are draped over the grow pot 12 and positioned such that water discharge outlets 60 are positioned where water discharge is desired. The relatively small size of the discharge outlets 60 acts against the pressurized liquid to produce a slow release of water over time. The parameters of the apparatus and process have been adjusted for the desired liquid flow rate. An apparatus suitable to water a plant in a 10 inch grow pot over a period of 3-4 days might, for example, require approximately 40 psig of gas pressure initially in the reservoir 16, an initial water volume of 2 liters, and discharge outlets 60 with diameters of approximately 0.0005 inches. The gas pressure and water volume can be adjusted to continuously supply the water. A relatively large water volume, low gas pressure, and/or pressure reducing means such as a small discharge opening diameter 60 on the valve 64 can be used to provide a release of water over relatively long periods of time. It may be alternatively desirable for some plants to allow the water supply to become exhausted in relatively short periods of time so that the plant experiences a drying period for a few days before replenishment of the water supply. If properly designed, the apparatus 10 according to the invention can continuously release water to the plant soil over a period of several days. Maintenance personnel would service the apparatus 10 at the end of each period, replenishing the apparatus 10 with liquid and gas.

The apparatus 10 according to the invention may be manufactured from materials and by processes which are known in the art. The materials and construction should preferably be capable of withstanding extended pressures of 40 psig or more. It is also desirable of couse that the materials of construction are resistant to deterioration by water or other chemicals which may be present.

This invention may be provided in other forms and embodiments without departing from the spirit or essential attributes thereof, and accordingly, reference should be made to the appended claims, rather than to the foregoing specification, as indicating the scope of the invention.

We claim:

1. A plant watering apparatus for attachment about the side of a plant for providing a liquid under pressure to a plant in a grow pot at a substantially constant rate, comprising:
   a closed reservoir affixed to the outside of said grow pot;
   means for introducing a liquid into said reservoir, said liquid introduction means being hermetically resealable;
   means about the upper portion of said reservoir for introducing a pressurized gas into said reservoir, said gas introduction means being hermetically resealable;
   a pressurized gas within said reservoir;
   conduit means communicating with the interior of said reservoir about the lower portion of said reservoir and extending outwardly and upwardly from said reservoir to said grow pot for delivering liquid under the pressure of said pressurized gas in said reservoir to the top portion of the plant, said conduit means having at least one discharge outlet;
   means for regulating flow of liquid through said discharge outlet so as to provide a substantially constant flow rate; and
   means for attaching said apparatus to the side of a grow pot.

2. The plant watering apparatus of claim 1, wherein the means for introducing a pressurized gas to the reservoir is a valve communicating with the interior of the reservoir.

3. The plant watering apparatus of claim 1, further comprising pressure indicating means.

4. The plant watering apparatus of claim 1, wherein the means for attaching the apparatus to a plant grow pot comprises an integral hanger with a downwardly opening hook portion adapted to engage the interior wall of the plant grow pot.

5. The plant watering apparatus of claim 1, wherein the means for attaching the reservoir to a plant grow pot is slideably attached to the apparatus.

6. The plant watering apparatus of claim 1, further comprising a means leveling the apparatus.

7. The plant watering apparatus of claim 10, wherein the means for leveling the apparatus comprises a leveling arm adapted to abut the exterior wall of the plant grow pot.

8. The plant watering apparatus of claim 1, wherein the leveling arm further comprises tab portions, the notched tab portions being adapted for manual removal.

9. The plant watering apparatus of claim 1, wherein the contour of a sidewall of the reservoir substantially matches the contour of the exterior wall of a plant grow pot.

* * * * *